United States Patent Office 3,138,511
Patented June 23, 1964

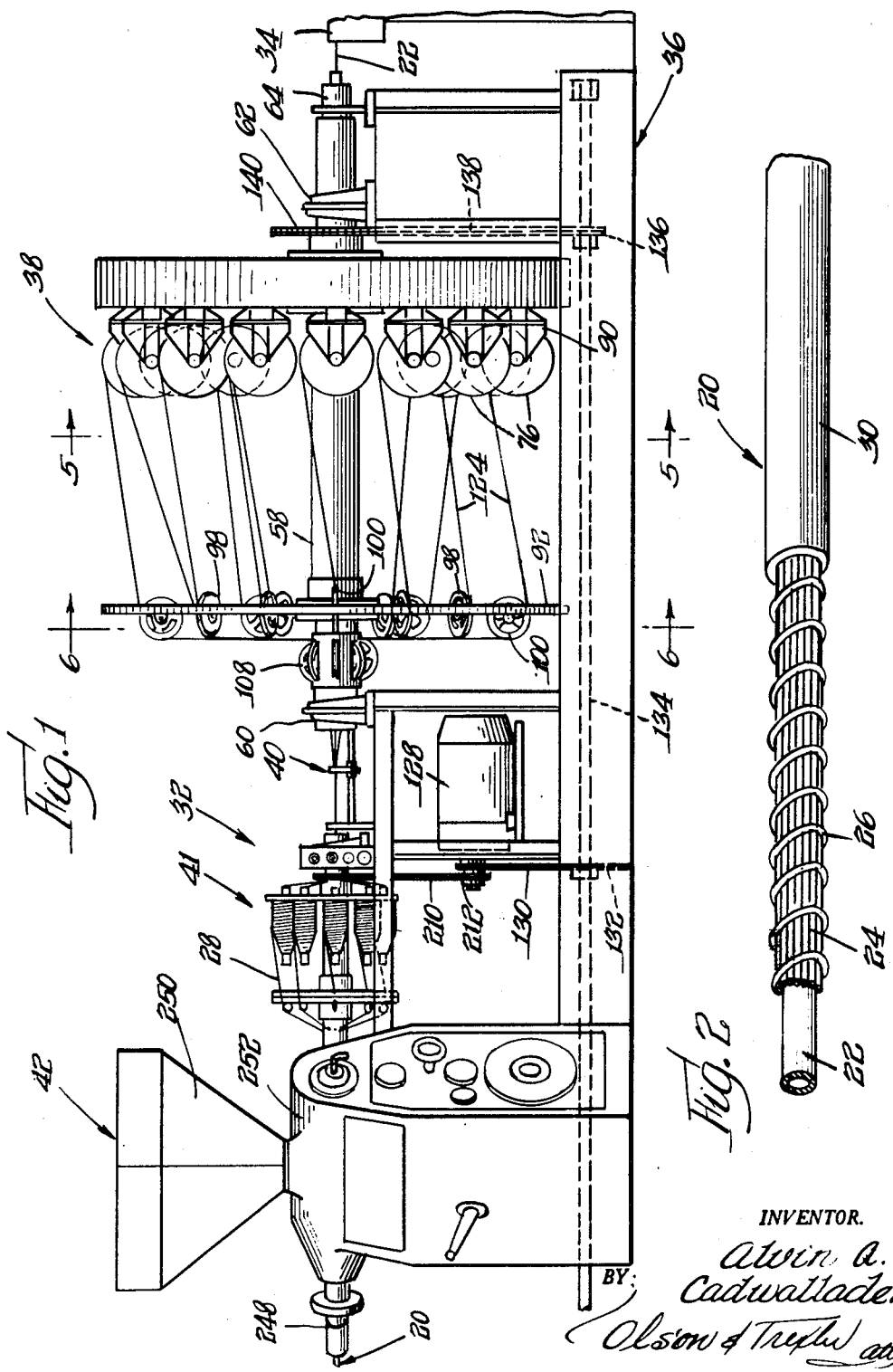

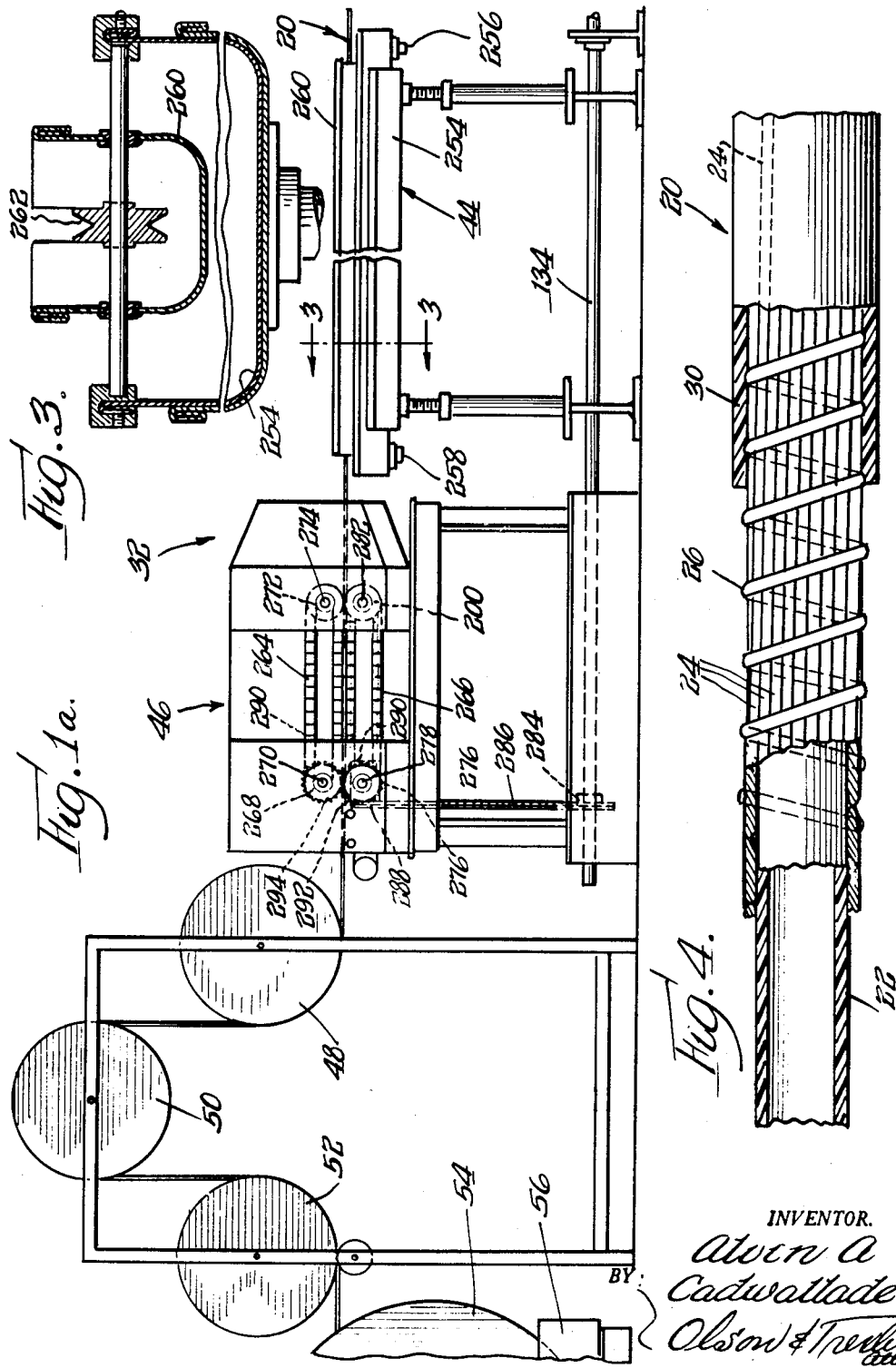

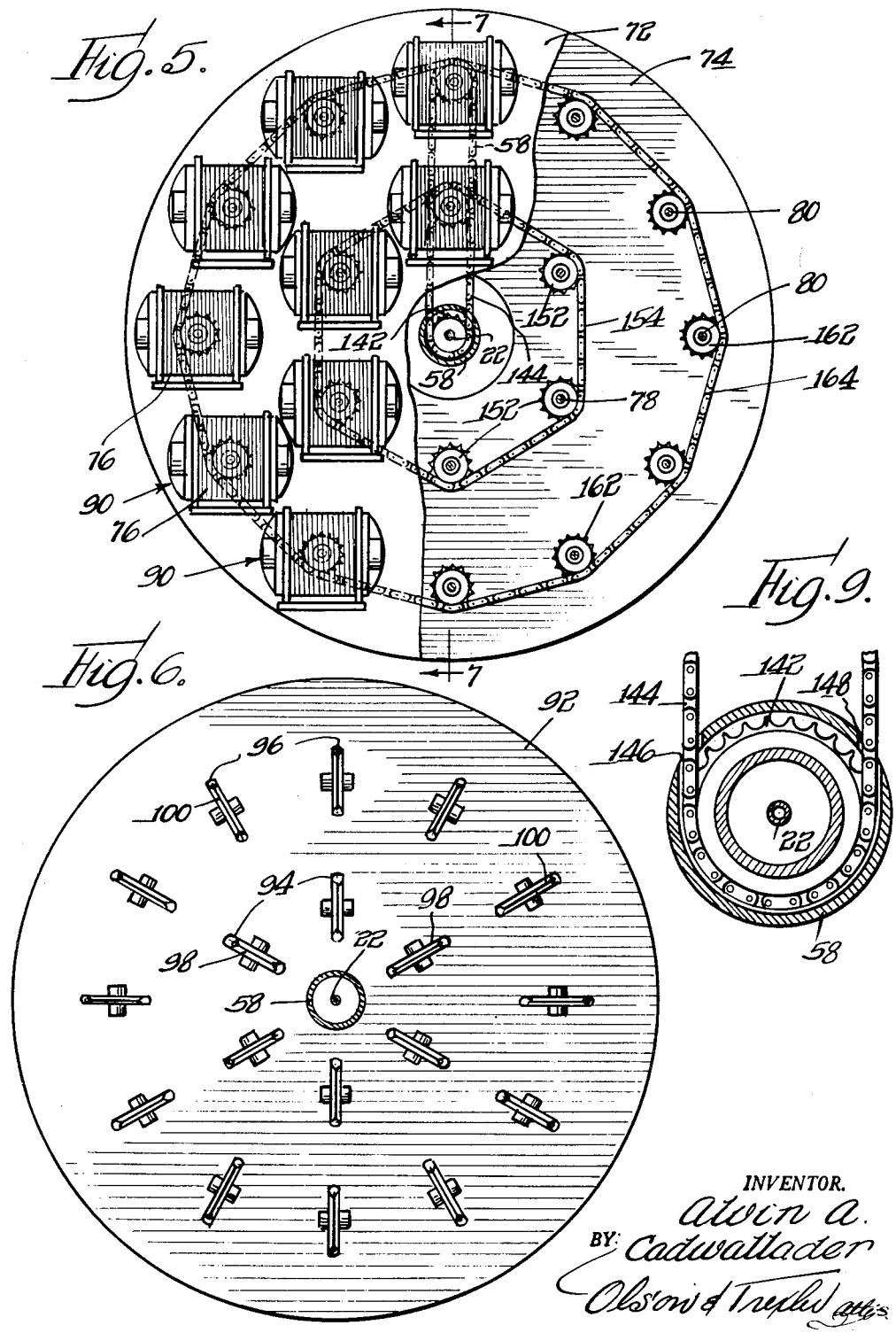

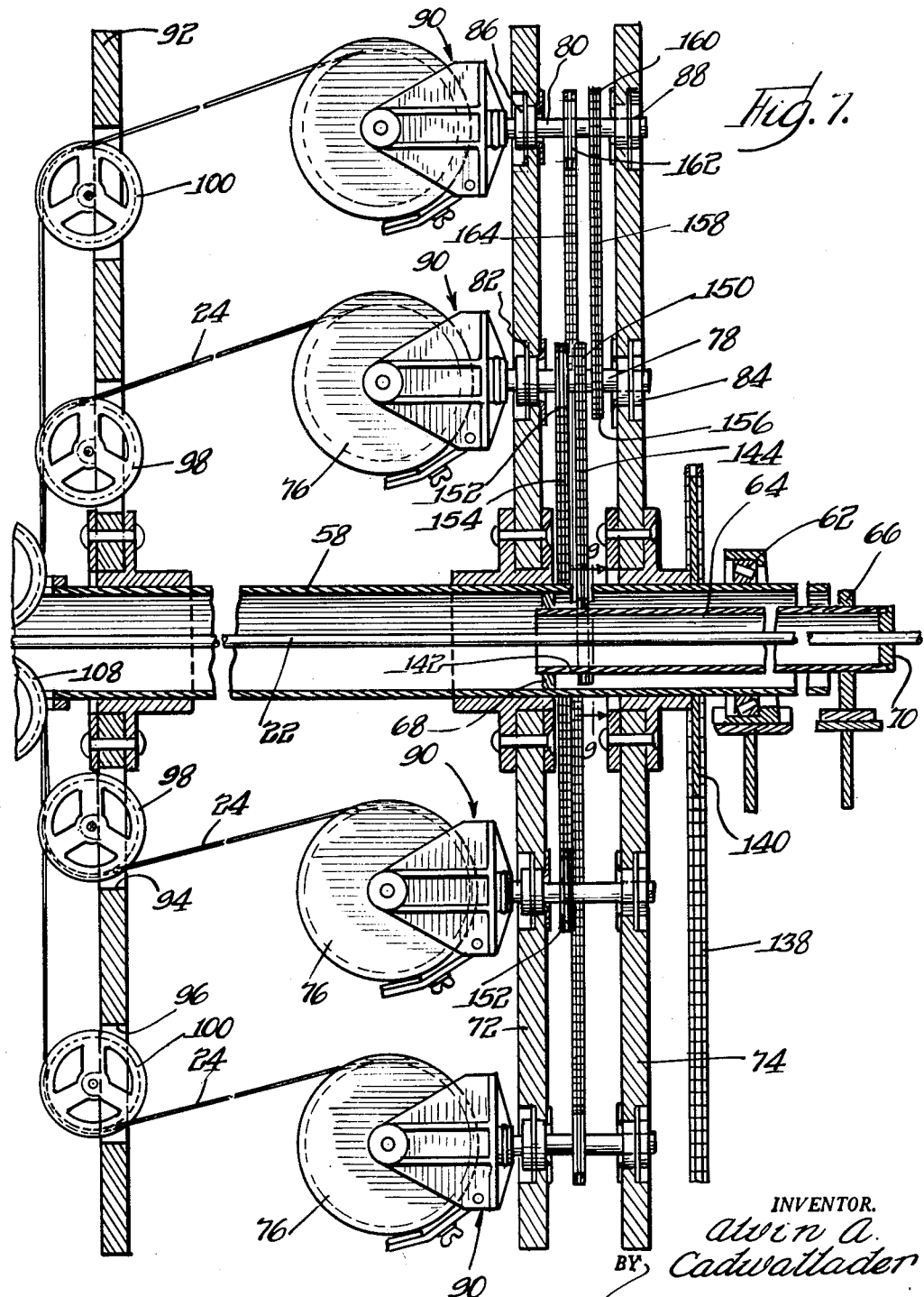

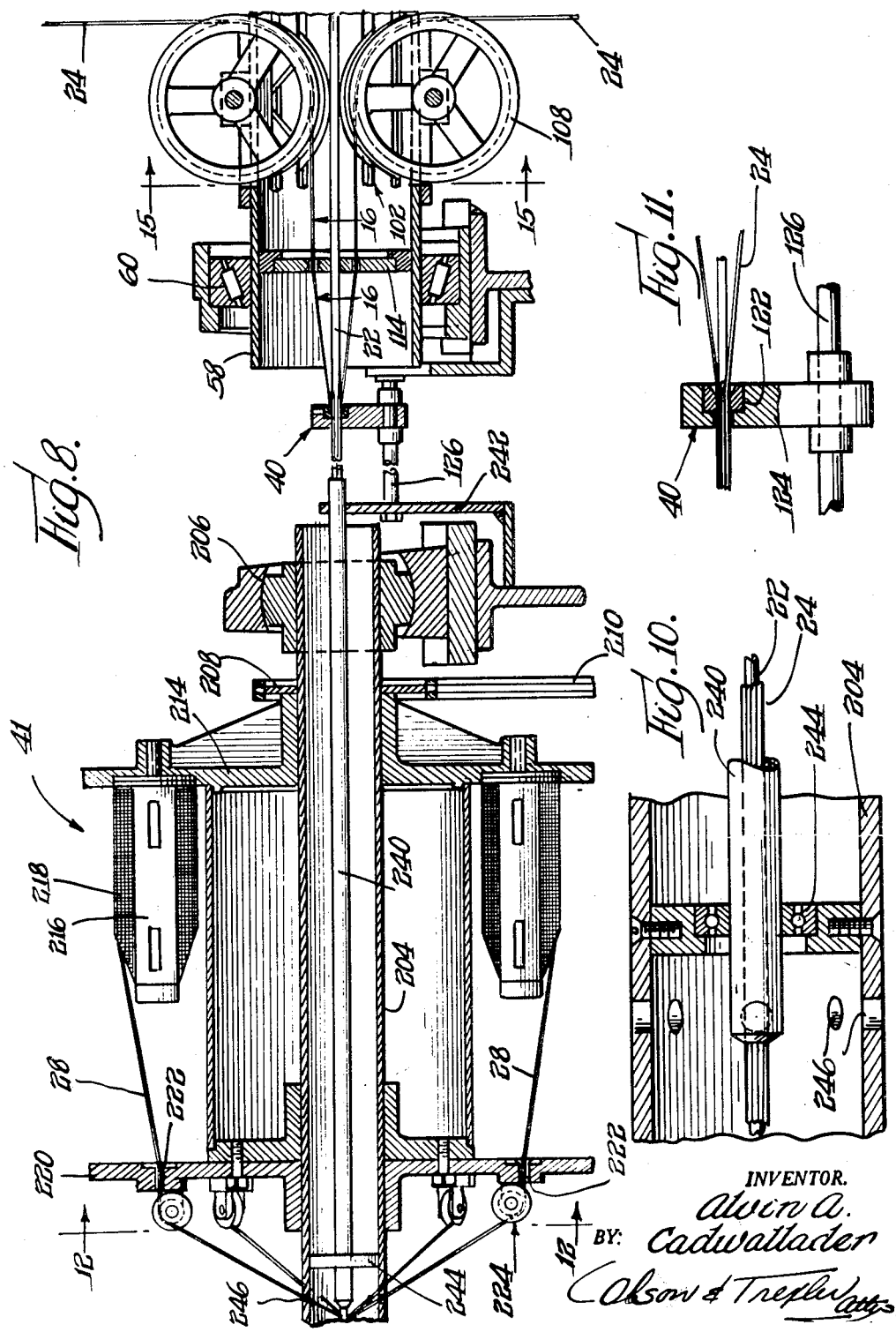

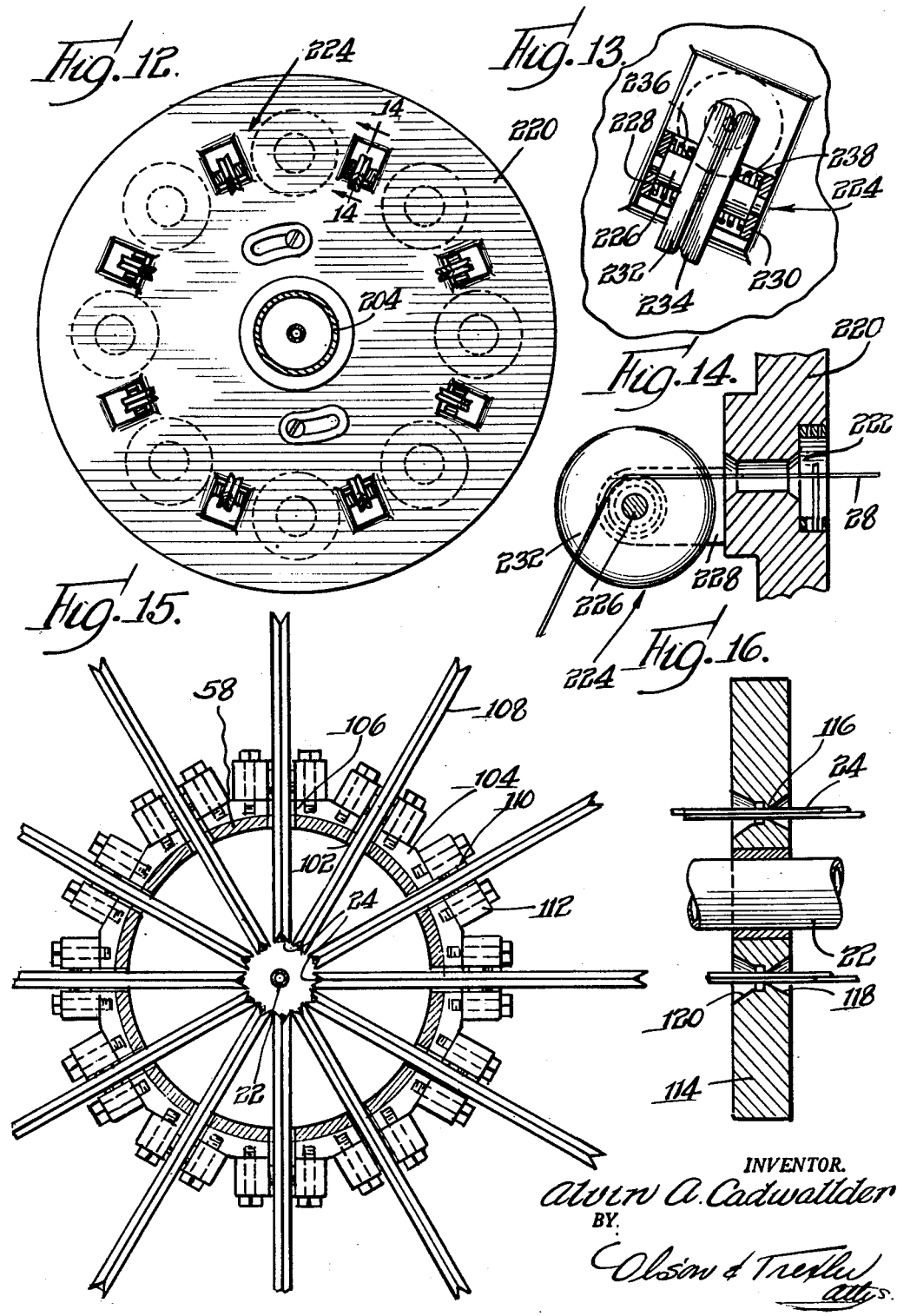

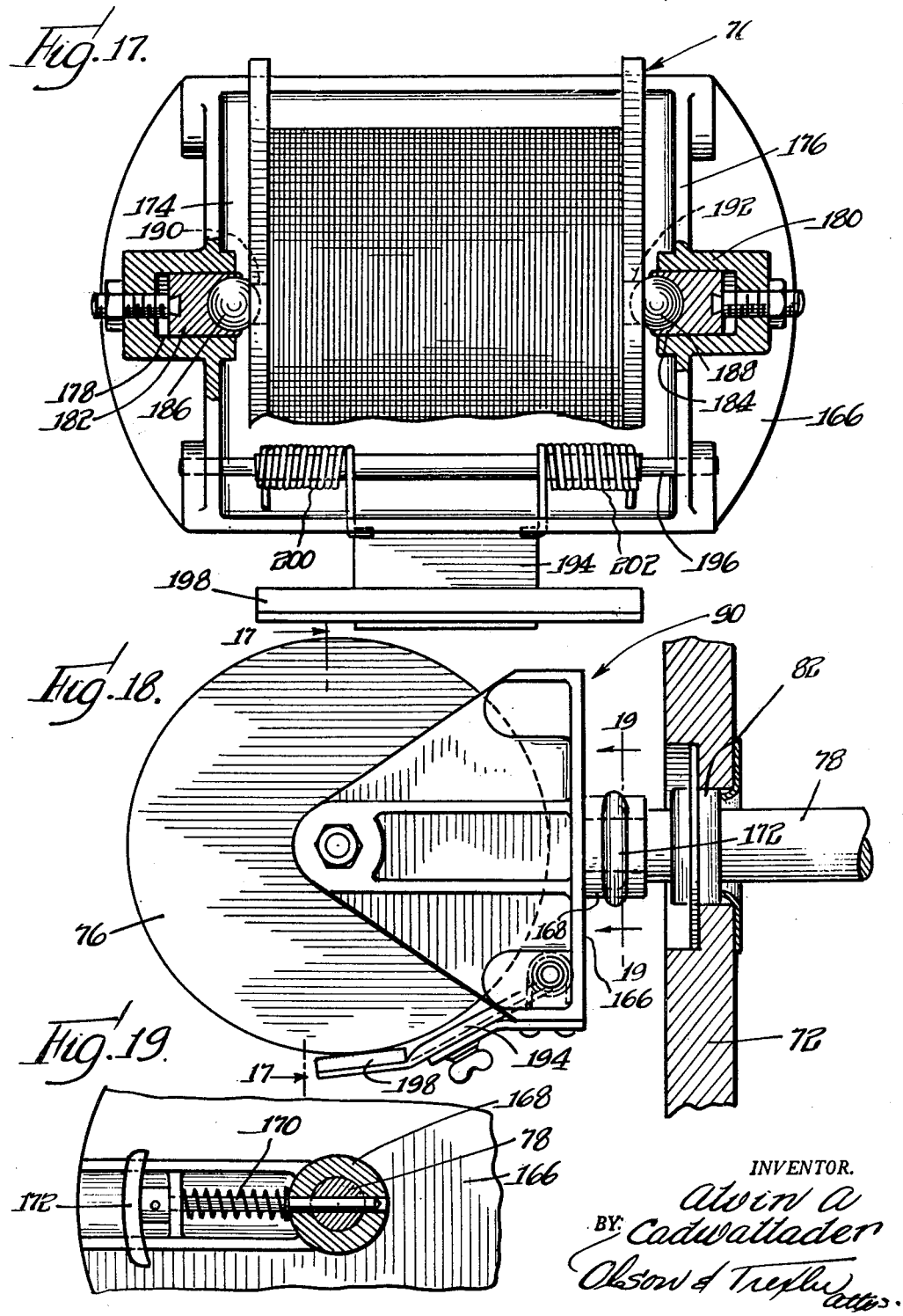

3,138,511
APPARATUS FOR MAKING A FLEXIBLE CONDUIT OF HELICALLY WOUND WIRES
Alvin A. Cadwallader, Hatboro, Pa., assignor to Teleflex Incorporated, North Wales, Pa., a corporation of Delaware
Filed May 5, 1960, Ser. No. 27,137
18 Claims. (Cl. 156—431)

The present invention relates to a novel method and apparatus for making a flexible conduit, and more specifically to a novel method and apparatus for making a conduit of the type disclosed and claimed in my co-pending application Serial No. 771,984, filed November 5, 1958, now Patent No. 3,063,303.

As disclosed more fully in the above mentioned application, a flexible conduit of the type which may be made by the method and apparatus of the present invention is especially suitable for use as a guide conduit for push, pull or rotary cables of a control system and the like. Such a conduit comprises an elongated plastic tube around which a sheath of individual wires is provided, which wires are helically wound with a very long lead. In addition, a cord or roving of Fiberglas or the like is wound around the wires with a relatively short lead for enhancing the hoop strength of the conduit, and a plastic sheath is provided around the wires and the cord.

An important object of the present invention is to provide a novel method and apparatus whereby flexible conduit generally of the above described type may be produced accurately and economically.

A more specific object of the present invention is to provide a novel method and apparatus for producing a conduit structure generally of the above described type rapidly and continuously.

Still another object of the present invention is to provide a novel method and apparatus of the above described type whereby a plurality of continuous wires may be helically wound with a long lead around a continuous tube without permanently twisting either the wires or the tube.

A further object of the present invention is to provide a novel method and apparatus for producing a flexible conduit generally of the above described type in a manner so that the conduit tends to assume a straight condition even after it has been coiled for storage or other purposes.

A more specific object of the present invention is to provide a novel apparatus of the above described type which may be economically operated and maintained.

Other objects and advantages of the present invention will become apparent from the following description and the accompanying drawings wherein:

FIGS. 1 and 1a combine together to provide a side elevational view of an apparatus incorporating features of the present invention;

FIG. 2 is a fragmentary perspective view partially broken away showing a conduit which is adapted to be produced by the method and apparatus of the present invention;

FIG. 3 is an enlarged fragmentary sectional view taken along line 3—3 in FIG. 1a;

FIG. 4 is an enlarged partial sectional view of a flexible conduit constructed in accordance with the present invention;

FIG. 5 is an enlarged sectional view taken generally along line 5—5 in FIG. 1 and partially broken away for showing a portion of the apparatus in greater detail;

FIG. 6 is an enlarged sectional view taken generally along line 6—6 in FIG. 1;

FIG. 7 is a further enlarged partial sectional view taken generally along line 7—7 in FIG. 5;

FIG. 8 is an enlarged partial vertical sectional view of a midportion of a part of the apparatus shown in FIG. 1;

FIG. 9 is a fragmentary sectional view on an enlarged scale taken generally along line 9—9 in FIG. 7;

FIG. 10 is an enlarged fragmentary sectional view of the left-hand end portion of the part of the apparatus shown in FIG. 8;

FIG. 11 is an enlarged partial sectional view showing a sizing die through which the tubing having the wires wound thereon passes;

FIG. 12 is a sectional view taken along line 12—12 in FIG. 8;

FIG. 13 is an enlarged fragmentary view showing one of the thread tensioning devices included in the portion of the apparatus shown in FIG. 12;

FIG. 14 is an enlarged fragmentary sectional view taken generally along line 14—14 in FIG. 12;

FIG. 15 is an enlarged sectional view taken generally along line 15—15 in FIG. 8;

FIG. 16 is an enlarged partial fragmentary sectional view taken along line 16—16 in FIG. 8;

FIG. 17 is a partial fragmentary sectional view taken along line 17—17 in FIG. 18;

FIG. 18 is an enlarged view partially in cross section showing means for mounting and controlling a spool of wire which is to be used in forming the conduit; and FIG. 19 is a fragmentary sectional view taken generally along line 19—19 in FIG. 18.

Referring now more specifically to the drawings wherein like parts are designated by the same numerals throughout the various figures, a flexible conduit 20 which is adapted to be produced by means of the method and apparatus of the present invention is shown in FIGS. 2 and 4. This conduit structure and the advantages thereof are described in detail in the above mentioned copending application. It suffices to state herein that the conduit comprises an elongated tubing 22 of suitable plastic material. A sheath of wires 24 is provided around the tubing 22, which wires are arranged in abutting relationship with respect to each other and are wound helically around the tubing 22 with the very long lead. The wires 24 are untwisted and the lead with which they are wound around the tubing 22 is sufficiently long so that the wires do not take a permanent set and are not bent during the winding operation beyond the elastic limit of the material of the wires.

In order to increase the hoop strength of the conduit and to retain or confine the wires 24, a cord or roving element 26 made up of a plurality of threads 28 (see FIGS. 1 and 8) is helically wound around the wires with a relatively short lead. In addition a sheath 30 of plastic material is extruded around the wires and the cord or roving 26.

An apparatus 32 incorporating features of the present invention is shown in somewhat simplified form in FIGS. 1 and 1a and comprises a source 34 for providing a substantially continuous supply of the tubing 22. This source which is only partially shown in FIG. 1 may be in the form of a support such as a rotatable table or drum for a large coil of the tubing 22 or, in certain installations the supply means 34 could be in the form of a machine for continuously extruding the tubing 22 and supplying the tubing directly to the remainder of the apparatus 32.

The apparatus 32 also includes elongated base or frame means 36 on which is mounted means 38 for supplying the wires 24 and applying the wires to the tubing 22. From the means 38 the tubing with the wires applied thereto passes through a sizing die 40 which will be described more in detail and to means 41 suitably supported on the base 36 for supplying the threads 28 and winding the threads in the form of a cord or roving 26 around the wires.

From the means 41, the tubing having the wires and roving wound thereon passes to extrusion means 42 which serves to extrude the sheath 30 of plastic material around the wires and the roving. Then the conduit passes through cooling means 44 shown in FIG. 1a and to traction means 46 which serves to pull the conduit through the preceding portions of the apparatus. The conduit is then directed in a tortuous path and flexed around a plurality of large diameter pulleys 48, 50 and 52 from which it passes to a wind up drum and storage reel 54. The reel 54 is driven in timed relationship with the traction means 46 by a motorized variable speed drive unit 56 of known construction.

The wire supplying and applying means 38 and details thereof are shown in FIGS. 1, 5–9 and 12–19. As shown best in FIGS. 1, 7 and 8, this means comprises a hollow tube or shaft 58 having an end portion thereof disposed downstream with respect to the direction of movement of the plastic tubing 22 rotatably supported by a bearing unit 60. An opposite end portion of the tube 58 is rotatably supported by a suitable bearing unit 62. A smaller tube or shaft 64 extends into the last mentioned end portion of the tube or hollow shaft 58, as shown in FIGS. 1 and 7. An outer end portion of the tube 64 is supported on a common axis with respect to the tube 58 and is fixed against rotation by means of a bracket 66. An inner end portion of the tube 64 is supported centrally within the hollow tube or shaft 58 by means of an annular spacing and bearing ring 68. A centrally apertured guide member 70 is secured within the outer end of the tube 64 for guiding the tubing 22 into the tubes 58 and 64.

Large diameter disc members 72 and 74 are mounted on and fixed against rotation relative to the tube or hollow shaft 58. As shown best in FIG. 7, these disc members are disposed in adjacent but axially spaced apart relationship. In order to support a plurality of spools 76 of the wire 24 in the manner described more fully below, shafts 78 extend between and are circularly spaced around the disc members 72 and 74 at a predetermined distance radially outwardly from the axis of the shaft 58. Additional shafts 80 are similarly arranged between the disc members 72 and 74 and in circularly spaced relationship, but these shafts are spaced radially outwardly from the shafts 78. The shafts 78 are supported by bearing means 82 and 84 respectively carried by the disc members 72 and 74 so that the shafts are rotatable relative to but axially fixed with respect to the disc members 72 and 74. The shafts 80 are similarly supported by identical bearing means 86 and 88 respectively mounted on the disc members 72 and 74. All of the shafts 78 and 80 carry identical bracket members 90 which will be described more in detail below and which in turn support the spools 76 so that the spools will rotate during unwinding of the wires 24 about parallel axes.

Another disc member 92 is mounted on and fixed with respect to the shaft 58 and spaced from the wire supply spools 76 downstream of the direction of movement of the tubing 22 as shown in FIGS. 1, 6 and 7. Slots 94 are formed in the disc member 92 and are circularly spaced therearound as shown in FIG. 6. The slots 94 correspond in number to and are generally aligned with although preferably disposed radially within the shafts 78. Slots 96 similar to the slots 94 are formed in the disc member 92 and are circularly arranged therearound and radially outwardly from the slots 94. The slots 96 correspond in number to and are respectively generally aligned with but preferably disposed radially at least partially within the shafts 80. Guide pulleys 98 and 100 are respectively rotatably mounted on the disc member 92 in association with the slots 94 and 96 for guiding the wires 24.

The wires 24 are directed radially inwardly from the pulleys 98 and 100 and through slots in the wall of the tube or hollow shaft 58 for application to the plastic tubing 22 in the manner to be described. More specifically, the hollow shaft 58 is formed with a plurality of circumferentially spaced and axially extending slots 102, as shown best in FIGS. 8 and 15. A sleeve member 104 is mounted on and fixed with respect to the tube or hollow shaft 58 and is provided with slots 106 which are respectively aligned with slots 102. Pulleys 108 which receive and guide the wires 24 through the slots 102 and 106 are rotatably mounted on the sleeve 104 by pairs of suitable bearing blocks 110 and 112. As shown in the drawings these pulleys project through the slots 102 and 106 and have a diameter which is sufficiently large so that innermost margins of the pulleys, in effect, define a relatively small circle concentric with and close to but radially spaced from the tubing 22, as shown best in FIG. 15. It will be noted that, in the embodiment shown, twelve pulleys 108 are provided, which number corresponds to the number of wire supply spools carried by the outer ring of shafts 80. Thus, certain of the pulleys 108 will serve to guide two wires since as indicated in FIGS. 5–7, the wires passing around the inner guide pulleys 98 from supply spools carried by the innermost ring of supporting shafts 78 are disposed in the same radial planes as a portion of the wires passing around certain of the outermost guide pulleys 100.

The wires 24 are directed from the innermost peripheries of the pulleys 108 to a guide plate 114 which is disposed within and fixed relative to an end portion of the hollow shaft or tube 58, as shown in FIG. 8. The guide plate which is also shown in FIG. 16, is provided with a plurality of circularly arranged apertures 116 through which the wires 24 extend. Preferably entering end portions 118 of the apertures are flared to facilitate the insertion of the wires therethrough and exit end portions 120 of the apertures are also flared to accommodate the change of direction of the wires which moves gradually inwardly from the apertures to the tubing 22, as shown best in FIG. 8. The number of circularly arranged apertures 116 may equal the number of wires to be applied to the tubing so that each wire is individually guided as it passes from one of the pulleys 108, or if desired, the number of apertures 116 used may be such that at least some of them will accommodate more than one wire 24.

As indicated in FIGS. 1, 8 and 11, the tubing and wires pass through the sizing die means 40 substantially immediately after the wires are laid upon the tubing. As shown best in FIGS. 8 and 11, the die means 40 comprises an apertured die element 122 mounted in a holder 124. The die holder is in turn fixed on a suitable support 126. As will be understood, the internal diameter of the die element 122 corresponds to the desired external diameter of the sheath provided by the wires 24.

The tubing 22 is drawn through the apparatus in a manner such that it does not rotate about its own axis. Therefore, the shaft 58 is driven in the manner described more in detail below for causing the wires 24 to be wrapped around the tubing 22 as they pass from the guide member 114. The speed with which the tubing 22 is drawn through the apparatus is correlated with the rate of rotation of the shaft 58 so that the wires are wrapped with a very long lead which is sufficient to prevent the wires from being bent beyond the elastic limit of the material thereof, said material preferably being steel.

Another important feature which is to be noted is that the shafts 78 and 80 which carry the supply reels or bobbins 76 are rotated relative to the main shaft 58 or, more specifically, held against rotation in space about their own axes in a manner which prevents the wires 24 from being twisted about their axes as they are laid on the tubing 22. More specifically, assuming that the shaft 58 is driven in a clockwise direction, as viewed in FIGS. 5 and 6, there is a tendency for the wires 24 to be twisted about their own axes as they are laid onto the nonrotating tubing 22 substantially at the sizing die 40. However, by rotating the shafts 78 and 80 and thus, the supply reels 76 in counter clockwise direction relative to the shaft 58 or, in other words, by holding the supply reels in fixed relationship in space, there is a tendency to twist the end portions of the wire 24 at the supply reels in a direction opposite to the twisting of the portions of the wires being laid onto the tubing. As a result, the twist of the wires at the supply reels or bobbins offsets the twist of the wires at the tubing so that as the wires are laid onto the tubing they are substantially free of any twist about their own axes.

In order to operate the main shaft 58 and the shaft 78 and 80 in the manner described above, drive means shown in FIGS. 1, 5, 7 and 9 is provided. This means includes an electric motor or other suitable prime mover 128 mounted on the base means 36 and adapted to drive a chain or belt 130 which in turn drives a sprocket 132 fixed on a rotatable shaft 134. The shaft 134 which is journalled in suitable bearings also carries a sprocket 136 which drives a chain 138 which in turn drives the shaft 58 through a sprocket 140 fixed thereon.

In order to hold the shafts 78 and 80 in fixed relationship in space while the main shaft 58 and the assemblies carried thereby are rotated, a sprocket 142 is fixed on the nonrotatable tube 64 as shown in FIGS. 5, 7, and 9. A chain 144 extends around the fixed sprocket 142 and outwardly from the main shaft 58 through openings 146 and 148 formed in the main shaft. The chain 144 extends radially outwardly and around a sprocket 150 which is fixed on one of the shafts 78. This shaft 78 and all the remaining shafts 78 carry similar sprockets 152 fixed thereto, which sprockets 152 are encircled and engaged by a chain 154. With this arrangement it is seen that the shafts 78 are positively interconnected by the chains 144 and 154 with the fixed sprocket 142 so that the shafts are held against rotation in space but are, in effect, rotated relative to the shaft 58 in a direction opposite to the direction of rotation of the shaft 58.

Another sprocket 156 is carried by one of the shafts 78 and this sprocket is encircled by an endless chain 158 which extends radially outwardly and also encircles a sprocket 160 fixed on one of the shafts 80. This shaft and all of the remaining shafts 80 respectively have fixed thereon sprockets 162 which are encircled by a chain 164. Thus the shafts 80 are also positively interlocked with the fixed sprocket 142.

The bracket means 90 for supporting and controlling the supply spools or bobbins 76 are shown best in FIGS. 5, 7, and 17–19. Each means 90 includes a bracket having a transverse base portion 166 having a hollow supporting shaft accommodating hub 168 projecting rearwardly therefrom. As shown best in FIG. 19 a spring biased pin 170 removably extends through aligned apertures in the hub portion 168 and the supporting shaft for detachably connecting the bracket with the shaft. A handle member 172 is preferably secured to an outer end of the pin for facilitating manipulation of the pin.

Spaced apart flanges 174 and 176 extend forwardly from opposite end portions of the bracket base 166. These flanges include aligned socket portions 178 and 180 shown best in FIG. 17 in which are respectively mounted bearing blocks 182 and 184. The blocks 182 and 184 respectively rotatably receive and retain ball bearing elements 186 and 188 which are adapted to project into apertures 190 and 192 in opposite ends of a spool 76 sufficiently rotatably to retain and support the spool.

In order to maintain a predetermined tension on the wires 24 as they are unwound from the spools 76, each of the means 90 is provided with a device for retarding the rotation of its associated spool in a predetermined manner. As shown best in FIGS. 17 and 18, such retarding means comprises a brake arm 194 pivotally carried on a shaft 196 extending between the bracket flanges 174 and 176. A pad 198 of suitable friction material is carried by an outer end portion of the arm 194 for engagement with the peripheral edges of opposite end flanges of the spool 76. Torsion springs 200 and 202 are disposed around the shaft 196 in a manner such that opposite ends thereof are respectively fixed with respect to the bracket and with respect to the brake arm for resiliently biasing the brake arm toward the spool 76.

The means 41 for applying the cord or roving 26 formed from the threads 28 is shown in FIGS. 1 and 8 and comprises a tubular shaft 204 having one end portion rotatably supported by bearing means 206 and an opposite end portion rotatably supported by similar bearing means, not shown. A sprocket 208 is fixed on the shaft 204 so that the shaft may be driven in timed relationship with the wire applying means 38 by means of an endless chain 210 which encircles the sprocket 208 and another sprocket 212 on the output shaft of the motor or prime mover means 128.

An annular disc or plate member 214 is fixed on the shaft 204 spindles 216 are mounted on the plate 214 and project therefrom as shown in FIG. 8. In the embodiment of the apparatus contemplated herein, eight of the spindles 216 are provided and are spaced uniformly in a circular arrangement around the plate member 214. The spindles 216 are respectively adapted rotatably to support supply bobbins 218 of the thread 28.

Another annular plate member or disc 220 is fixed on the shaft 204, and this plate member is formed with a plurality of circularly spaced apertures 222 therethrough. The apertures 222 are generally aligned with the spindles 216 and are adapted to receive and guide the threads 28. Of course, there is preferably provided an aperture 222 for each of the spindles.

As shown best in FIGS. 8 and 12–14, thread tensioning means 224 are mounted around the face of the plate member 220 and respectively associated with each of these apertures 222. Each of the tensioning means includes a shaft 226 mounted between bracket members 228 and 230 secured to and projecting from the plate member 220. Pressure discs 232 and 234 are rotatably and relatively axially shiftably mounted on the shaft 226 in opposing relationship. Compression springs 236 and 238 are provided for biasing the discs 232 and 234 toward each other. As shown best in FIGS. 8, 13, and 14, the threads 28 pass between the opposing pressure discs 232 and 234 which engage the threads with predetermined pressure so that the desired tension is maintained in the portion of the thread passing from the tensioning means or devices 224 to the conduit.

As shown best in FIG. 8, a guide tube 240 extends from adjacent the sizing die means 40 and into the hollow shaft 204. The guide tube 240 is concentric with the shaft 204 and has an outer end supported and fixed by a suitable bracket 242. An opposite end portion of the guide tube is supported within the hollow shaft by annular bearing means 244 so that the shaft is free to rotate relative to the fixed tube.

The plastic tubing 22 with the wires 24 wound between thereon enters the guide tube 240. The interior dimension of the guide 240 is slightly greater than the diameter of the sheath provided by the wires 24 around the tubing 22 so that the tubing and wires may slide freely through the guide tube 240 and at the same time the wires will be retained in the desired relationship around the tubing 22 by the guide tube 240.

As shown in FIG. 8, the guide tube 240 extends downstream of the direction of movement of the tubing 22 beyond the position of the tensioning devices 224. In addition, apertures 246 are formed in the hollow shaft 204 and are spaced therearound in the vicinity of the end of the guide tube 240. The threads 28 are directed from the tensioning devices 224 through the apertures 246 and are wound onto and around the sheath of wires 24 at a location immediately adjacent the end of the guide tube 240. It will be noted that the location of the end of the guide tube and of the apertures 246 slightly downstream from the position of the tensioning devices 224 causes the threads to be directed to the conduit at an angle to a plane perpendicular to the conduit which is relatively small, and this arrangement in combination with the timing of the speed of rotation of the shaft 204 with respect to the speed of advancement of the conduit causes the threads 28 to be wound around the wires 24 in the form of the cord or roving having spaced helical coils with a relatively short lead angle. Preferably, the end of the guide tube 240 is bevelled, as shown best in FIG. 10, for guiding the threads onto the conduit at the desired angle.

The partially fabricated conduit passes from the thread or roving applying means through an extrusion head 248 of the extrusion means 42. The extrusion head is of known construction and need not be described in detail. It suffices to state that the extrusion head is constructed so that as the partially formed conduit passes continuously and centrally therethrough, the above mentioned sheath 30 of suitable plastic material such as nylon or polyethylene is extruded in a substantially straight line and around the partially formed conduit. The remaining portions of the extrusion means 42 may also be of known construction and include a hopper 250 for containing a supply of pellets or the like of the plastic stock material, and means 252 for receiving the stock material from the hopper and melting the plastic material and thereafter forcing the melted material to and through the extrusion head 248. The means 252 is adjustable in a known manner so that the plastic material may be extruded from the head 248 in timed relationship with the rate of advancement of the conduit.

The cooling means 44 through which the conduit passes from the extrusion head is shown in FIGS. 1a and 3. This means comprises a first relatively large trough 254 extending along the path of travel of the conduit 20 and having an inlet 256 and an outlet 258 adjacent opposite ends thereof for a cooling liquid such as water. A second smaller trough 260 is supported above and partially submerged within the trough 254, and the trough 260 is also adapted to contain a cooling liquid such as water. Pulleys 262 are suitably rotatably mounted and spaced along the trough 260 for supporting the conduit.

The conduit advancing or pulling means 46 comprises upper and lower endless belts 264 and 266 having opposing courses between which a substantial length of the conduit is gripped. The belts may be of various suitable constructions and preferably are provided by hingedly connected blocks having conduit accommodating grooves or seats formed therein. The belt 264 extends around a drive pulley 268 mounted on shaft 270 and around an idler pulley 272 mounted on shaft 274. The belt 266 similarly encircles a drive pulley 276 on shaft 278 and an idler pulley 280 on shaft 282. The belts 264 and 266 are driven in timed relationship with the remainder of the apparatus so that the speed of advancements of the conduit is correlated with the rate of rotation of the wire applying means 38 and the thread applying means 41. More specifically, the drive shaft 134 is extended as shown in FIG. 1a to a location beneath the feeding or pulling means 46. The shaft carries a sprocket 284 which is encircled by a chain 286. The chain 286 also extends around a sprocket 288 fixed on an input shaft of a transmission or gear box 290 which has an output shaft coupled with the shaft 278. The shaft 270 is driven from the shaft 278 through suitable gears 292 and 294.

The method of producing conduit in accordance with the present invention and with the aid of the apparatus described above is as follows. The tubing 22 is formed from a suitable plastic material such as polytetrafluoroethylene or polyethylene which has desirable antifriction or lubrication characteristics. The tubing is preferably extruded in a straight line so that the memory characteristic of the plastic material tends to cause the finished conduit to assume a straight condition even after the conduit has been coiled for storage or other purposes. As indicated previously herein, the tubing 22 is drawn from the supply means 34 which may either be a suitable mechanism for retaining a coil of previously extruded tubing, or means for extruding the tubing.

As the tubing is drawn through the apparatus continuously and at a predetermined speed, the wires 24 are laid in abutting relationship onto the tubing to form a substantially continuous metallic sheath around the tubing 22. As described more in detail above, the wires are helically wound with a long lead around the tubing so that no permanent set is imparted to the wires which will impair subsequent flexing of the conduit, and in addition, the wires are laid so that they are not twisted about their own axes. As the partially assembled conduit advances, the roving or cord 26 is wound around the wire sheath for retaining the wires together, and the plastic sheath is then extruded around the wires and roving. The sheath 30 is also extruded in a line so that the memory characteristic of the plastic material further aids in causing the finished conduit to tend to assume a straight condition. Subsequently the plastic sheath is cooled as it passes through the bath of cooling liquid, and the finished conduit is flexed back and forth as it passes around the pulleys 48, 50 and 52 on its way to the drum 54 for enhancing the flexibility of the conduit.

While the preferred embodiment of the present invention has been shown and described herein, it is obvious that many details may be changed without departing from the spirit and scope of the appended claims.

The invention is claimed as follows:

1. An apparatus for making conduit comprising a rotatable hollow shaft, first disc means fixed for rotation with said shaft and including at least one face disposed in a plane normal to the rotative axis of said shaft, means for supporting flexible tubing coaxially within said shaft, means for continuously advancing said tubing along the rotative axis of said shaft, a first set of shafts rotatably supported upon said disc means normal to said face, the axes of said first set of shafts being disposed in a first circle concentric with said hollow shaft, a second set of shafts rotatably supported upon said disc means normal to said face, the axes of said second set of shafts being disposed in a circle concentric with and of smaller diameter than said first circle, a bracket fixed to each shaft of said first and second sets, all brackets being disposed on the same side of said disc means face, a wire containing spool rotatably supported in each bracket on an axis perpendicularly intersecting the bracket supporting shaft axis, means for restraining each of the shafts of said first and second sets against rotation about its own axis, each shaft of said second set being radially aligned with a shaft of said first set, a second disc means fixed for rotation with said hollow shaft and parallel to and axially spaced from said first disc means, said second disc means including a first set of wire guide means corresponding in number and aligned with the shafts of said first set and adapted to receive the wires from the spools associated with the aligned shafts, said second disc means including a second set of wire guide means corresponding in number and aligned with the shafts of said second shaft set and adapted to receive the wires from the spools associated with the aligned shafts of the second set, a third set of wire guide means associated with said hollow shaft for rotation therewith and axially spaced from said second disc means in the direction of tubing movement, the guide means of the third set being disposed radially proximate said tubing, a guide plate fixed for rotation with the hollow shaft and including a plurality of apertures for receiving the wires from the third guide means whereby said wires pass closely parallel to the tubing immediately before being wrapped thereabout on a long lead, means disposed concentrically about the tubing for continuously wrapping a plurality of elements of relatively high tensile strength about said wires wrapped on a long lead to firmly retain the same upon the tubing, and means for extruding a plastic sheath about said plurality of elements and long lead wires.

2. An apparatus for making conduit as set forth in claim 1 in which the means for restraining rotation of the shafts of the first and second sets against rotation comprises a sprocket fixed to each of said shafts, a first chain operatively engaging all of the sprockets of said first set of shafts, a second chain operatively engaging all of the sprockets of said second set of shafts, a sprocket member fixed against rotation, and third chain means operatively connected to said sprocket member and to at least one shaft of each of said first and second sets of shafts whereby said shafts are prevented from rotating about their own axes.

3. An apparatus for making conduit as set forth in claim 2 in which said first disc means comprises a pair of parallel and closely spaced disc members, said disc members including aligned bearings for supporting the shafts of said first and second sets, said sprockets and chains being disposed between said pair of disc members.

4. An apparatus for making conduit as set forth in claim 1 in which said first set of wire guide means of the second disc means comprises a first set of pulleys rotatably supported in said disc means, said second set of wire guide means comprises a second set of pulleys rotatably mounted in said second disc means, all of said pulleys being radially aligned with the rotative axis of said hollow shaft.

5. An apparatus for making conduit as set forth in claim 1 in which said third set of wire guide means comprises circumferentially spaced pulleys rotatably supported upon said hollow shaft.

6. An apparatus for making conduit as set forth in claim 5 in which the pulleys of said third set of wire guide means are radially aligned relative to the rotative axis of said hollow shaft, said latter pulleys projecting through openings in said hollow shaft such that the radially inner ends of said pulleys terminate closely proximate said tubing.

7. An apparatus for making conduit as set forth in claim 1 in which said guide plate is fixed within said hollow shaft and disposed substantially perpendicularly to the rotative axis of said shaft.

8. An apparatus for making conduit as set forth in claim 1 in which said guide plate is fixed within said hollow shaft and disposed substantially perpendicularly to the rotative axis of said shaft, said guide plate apertures being generally longitudinally aligned with the radially inner ends of the pulleys of said third set of wire guide means.

9. An apparatus for making conduit as set forth in claim 1 in which the means for continuously wrapping a plurality of elements about said long lead wires comprises a second hollow shaft coaxially aligned with said first hollow shaft and through which said tubing is adapted to pass, means for rotating said second hollow shaft in predetermined relationship to the rotative speed of said first hollow shaft, disc means fixed to said second hollow shaft for rotation therewith, a plurality of spool means mounted on said disc means for supplying said plurality of elements for wrapping about said long lead wires.

10. An apparatus for making conduit as set forth in claim 9 in which the second hollow shaft disc means comprises a pair of axially spaced disc members, the first of said disc members being adapted to support said spools, the second disc member being axially spaced from said first disc members in the direction of tubing movement and including guide means for receiving said plurality of elements from the spools whereby said elements may be directed generally radially inwardly for wrapping about said long lead wires.

11. An apparatus as set forth in claim 10 in which the guide means for receiving said plurality of elements from the spools includes a device for maintaining each of said elements under tension as it is wrapped about said long lead wires.

12. An apparatus as set forth in claim 11 in which said tension maintaining means comprises a pair of pressure discs between which at least one of said elements is received, and spring means biasing said discs toward each other.

13. An apparatus for making conduit as set forth in claim 9 in which said second hollow shaft includes a plurality of circumferentially spaced holes through which said plurality of elements is adapted to pass prior to being wrapped about said long lead wires, said plurality of holes being axially spaced in the direction of tubing movement from said second disc member.

14. An apparatus for making conduit as set forth in claim 13 in which a guide tube is coaxially supported within said second hollow shaft and which slidably supports the tubing overlaid with said long lead wires.

15. An apparatus for making conduit as set forth in claim 14 in which said guide tube is restrained against rotation within said second hollow shaft, said guide tube including one end terminating intermediate said guide plate and the first disc member fixed to said second hollow shaft, the other end of said guide tube terminating in general alignment with the plurality of holes formed in said second hollow shaft.

16. An apparatus for making conduit as set forth in claim 14 which includes a sizing die disposed between said guide plate and the one end of said guide tube.

17. An apparatus for making conduit as set forth in claim 1 in which the guide means of the third set correspond in number to the shafts of said first set, alternate of the guide means of said third set receiving a plurality of wires from said first and second sets of guide means.

18. An apparatus as set forth in claim 1 in which the means for wrapping a plurality of elements about said long lead wires includes a device for maintaining each of said elements under tension as it is wrapped about said long lead wires.

References Cited in the file of this patent

UNITED STATES PATENTS

| | | |
|---|---|---|
| 749,752 | Schoonmaker | Jan. 19, 1904 |
| 1,878,885 | Pahl | Sept. 20, 1932 |
| 2,099,876 | Weaver | Nov. 23, 1937 |
| 2,343,747 | Chernack | Mar. 7, 1944 |
| 2,491,152 | Beidle | Dec. 13, 1949 |
| 2,730,762 | Ballard | Jan. 17, 1956 |
| 2,780,906 | Fewtrell et al. | Feb. 12, 1957 |
| 2,802,328 | Ritchie | Aug. 13, 1957 |
| 2,810,424 | Swartswelter et al. | Oct. 22, 1957 |
| 2,989,430 | Pulaski | June 20, 1961 |

FOREIGN PATENTS

| | | |
|---|---|---|
| 471,560 | Italy | May 17, 1952 |
| 448,321 | Canada | May 4, 1948 |
| 829,480 | Great Britain | Mar. 2, 1960 |